United States Patent [19]

Ducuing

[11] 3,764,105

[45] Oct. 9, 1973

[54] DEVICE FOR CHANGING THE WHEELS OF AN AIRCRAFT

[76] Inventor: Yves Ducuing, Villa Athena 26 Ave. Varavilla, Roquebrune-Cap-Martin, France

[22] Filed: Apr. 19, 1971

[21] Appl. No.: 135,150

[30] Foreign Application Priority Data

Apr. 24, 1970 France .............................. 7014990
Oct. 19, 1970 France .............................. 7037904
Feb. 19, 1971 France .............................. 7105674

[52] U.S. Cl. ............................................. 254/2 R
[51] Int. Cl. ............................................. B60p 1/00
[58] Field of Search ..................... 254/2, 7, 99, 100, 254/84, 8

[56] References Cited
UNITED STATES PATENTS

| | | | |
|---|---|---|---|
| 2,895,712 | 7/1959 | Stovern et al. | 254/100 |
| 2,805,839 | 9/1957 | Branick | 254/2.4 |
| 2,502,037 | 3/1950 | Erikainen | 254/26 |
| 2,760,756 | 8/1956 | Lucker | 254/99 |
| 3,356,184 | 12/1967 | Bidgood | 254/7 R |
| 2,805,839 | 9/1957 | Branick | 254/2 R |
| 2,238,237 | | Thompson | 254/84 |

*Primary Examiner*—Othell M. Simpson
*Assistant Examiner*—Robert C. Watson
*Attorney*—Milton J. Wayne

[57] ABSTRACT

The present invention concerns a device for changing the wheels of an aircraft or other vehicle of large mass, consisting of a sloping column and mobile system which slides along this column, moved by any means.

The device is characterized by the fact that the base of the column rests on a stand, which may be mobile, and which may be combined with means of distributing the load, and by the fact that the upper part of the column is connected to the stand by a stabilizing system such as a strut attached to the stand, and possibly a lateral triangular support system.

11 Claims, 9 Drawing Figures

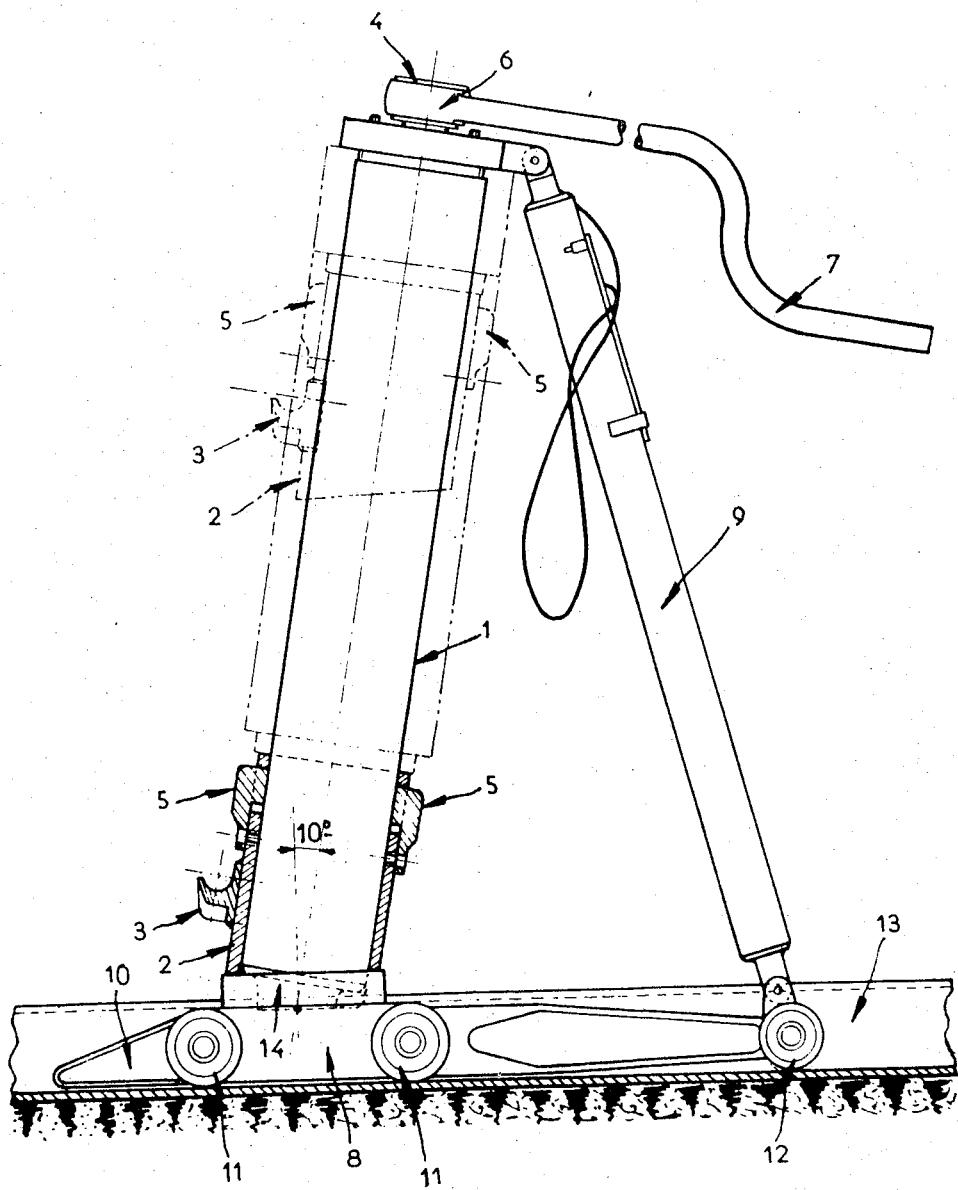

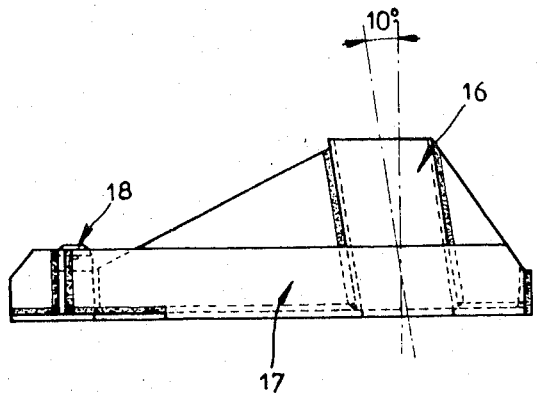
Fig: 3A.
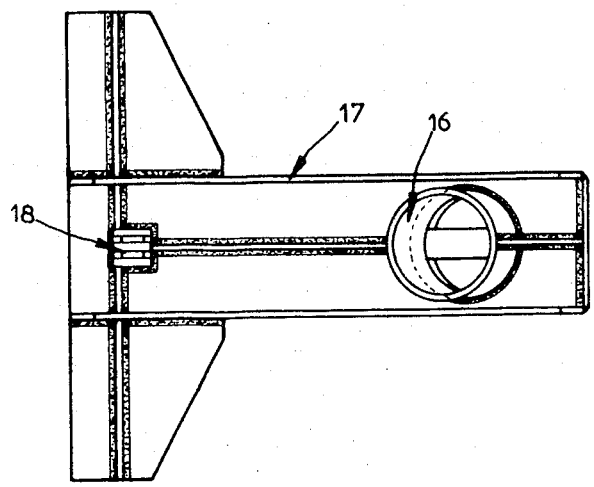
Fig: 3B.

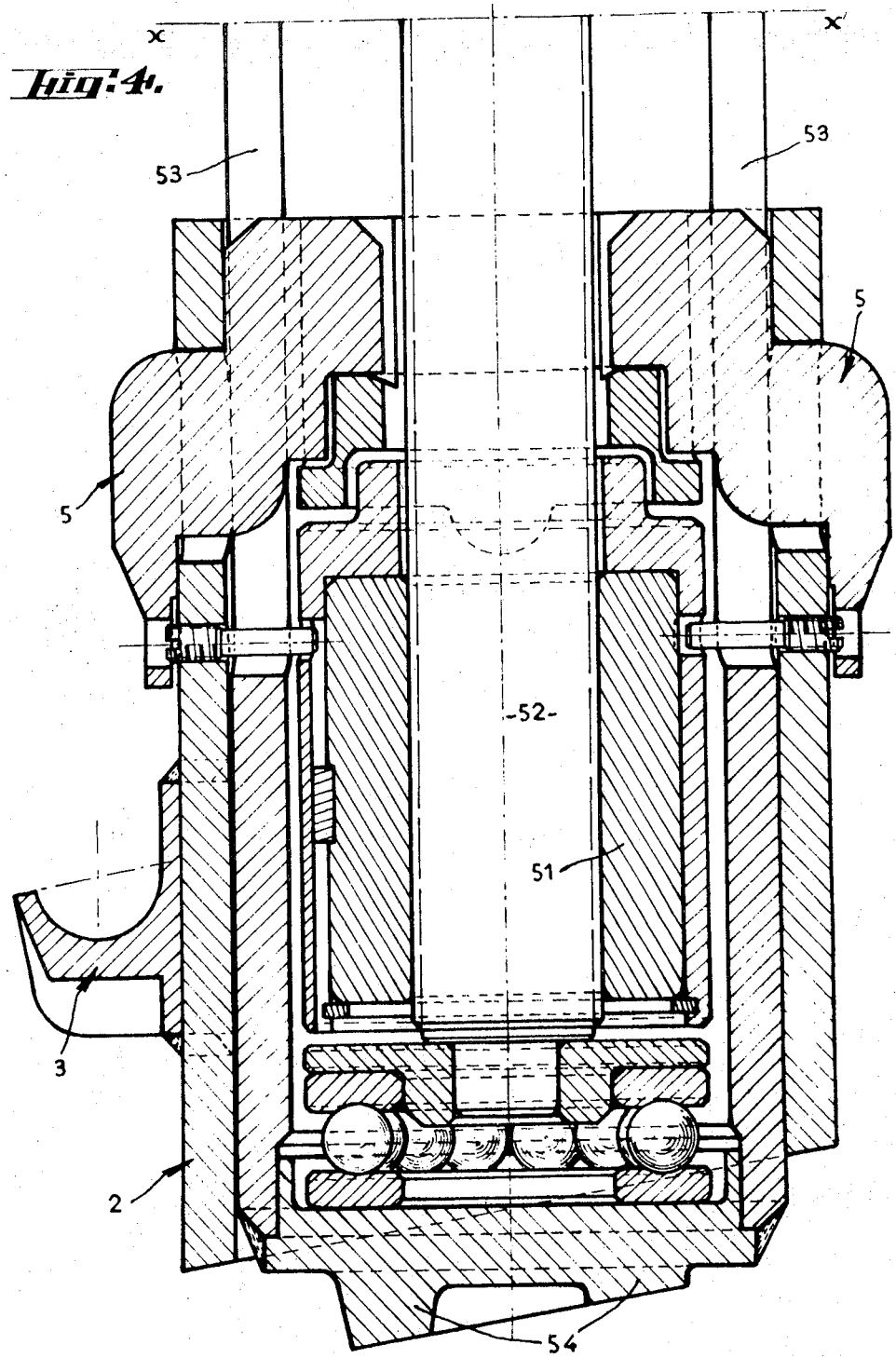

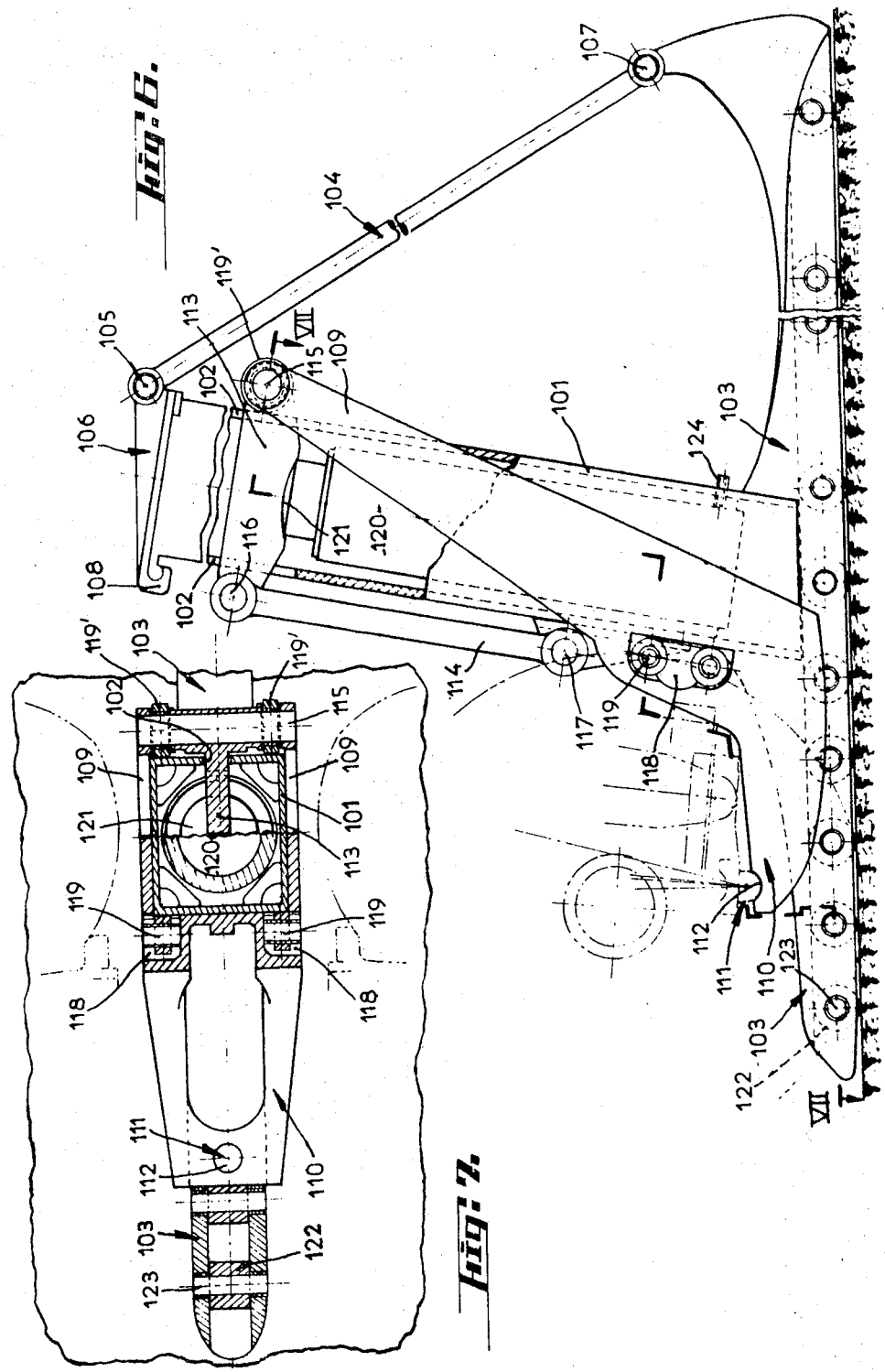

DEVICE FOR CHANGING THE WHEELS OF AN AIRCRAFT

The present invention concerns a device for changing the wheels of an aircraft.

Although the description below is confined to changing the wheels of an aircraft, the invention can naturally apply to changing, or simply checking and adjusting, the wheels of any vehicle mounted on wheels or caterpillar tracks, such as lorries, tanks, or helicopters.

The complexity of the undercarriages of modern aircraft and the difficulties of access, as well as the heavy loads that need to be raised to release the wheels from the ground, have led aircraft manufacturers to produce sometimes extremely heavy and cumbersome installations for the changing or simply checking of the wheels and brakes on such aircraft.

This handicap has meant that wheels cannot be changed unless the airport involved has the proper equipment for each individual aircraft. In addition, the equipment normally used requires the aircraft to be lifted, partly or occasionally even completely. In any case the operation is lengthy and tricky, requiring trained staff and sometimes even a hangar to protect the aircraft from the effects of wind.

In fact, if aircraft are to remain independent regardless of where they land, they must carry the equipment on board allowing them to be raised. Unfortunately, the systems so far designed for many types of aircraft are very heavy, reducing the payload and thus considerably reducing the earning capacity of the flight, for both military and civil aircraft.

The device for changing wheels relating to the present invention has the following advantages.

It is extremely light (about 50 kg) for a medium-weight aircraft.

It is easy to operate, and can be handled by one man.

Its positioning, and the raising and lowering operations, take only a very short time.

When raised, the aircraft remains stable, and more or less horizontal, throughout the operation.

The device can be used out of doors, in light to medium-strong winds.

The device takes up very little space, and it allows the main or auxiliary wheels to be changed on any type of ground, and allows access to the braking system.

The cost price is reasonable, and there is almost no maintenance.

The present invention concerns a device for changing the wheels of an aircraft or other vehicle of large mass, consisting of a sloping column and mobile system which slides along this column, moved by any means, the said device being characterized by the fact that the base of the column rests on a stand, which may be mobile, and which may be combined with means of distributing the load, and by the fact that the upper part of the column is connected to the stand by a stabilizing system such as a strut attached to the stand, and possibly a lateral triangular support system.

According to one embodiment of the invention, the stand is a mobile truck.

According to another embodiment of the invention, the column slopes in relation to the stand at an angle of approximately 5° to 20°, and preferably 8° to 12°.

According to yet another embodiment of the invention, the column is embedded in the truck.

According to another embodiment of the invention, the column fits into a socket on the stand.

According to another embodiment of the invention, the means of distributing the load consist of a roller-track which may be equipped with lateral guidance means.

According to yet another embodiment of the invention, the mobile system is a slider which includes a reception component; the slider is moved along the column by mechanical means such as an endless screw, or by hydraulic or pneumatic means.

According to one embodiment of the invention, the mobile system consists of two side arms and includes a reception socket, the upper ends of the arms being supported by a balance-beam which rests on the driving system.

According to another embodiment of the invention, the two side arms are joined at the bottom to form a cradle, which carries the said reception socket, the upper ends of the arms being attached to one end of the balance-beam, the other end of which is connected to the cradle by means of a connecting-rod.

According to yet another embodiment of the invention, the said arms are carried on the column by means of oscillating devices which slide or roll on the frontal surface of the column, such as bogies, or runners.

According to yet another embodiment of the invention, the said arms are connected to the balance-beam by means of devices helping to absorb the stress, such as wheels or runners.

Other purposes and advantages of the present invention will appear from the detailed description below and the figures accompanying it; the invention is not confined to these descriptions and figures, which involve only one possible embodiment of the said invention.

FIG. 1 shows one embodiment of the device according to the invention.

FIGS. 3a and 3b show another embodiment of the means of distributing the load.

FIG. 4 shows a cross-sectional view of a sliding system according to the invention.

FIG. 6 shows another embodiment of the device according to the invention, and FIG. 7 a cross-sectional view along the line VII—VII on FIG. 6.

The device shown in FIG. 1 consists of an oblique column 1 and a sliding device 2 carrying a hook 3, which forms the reception device.

Figure 5:
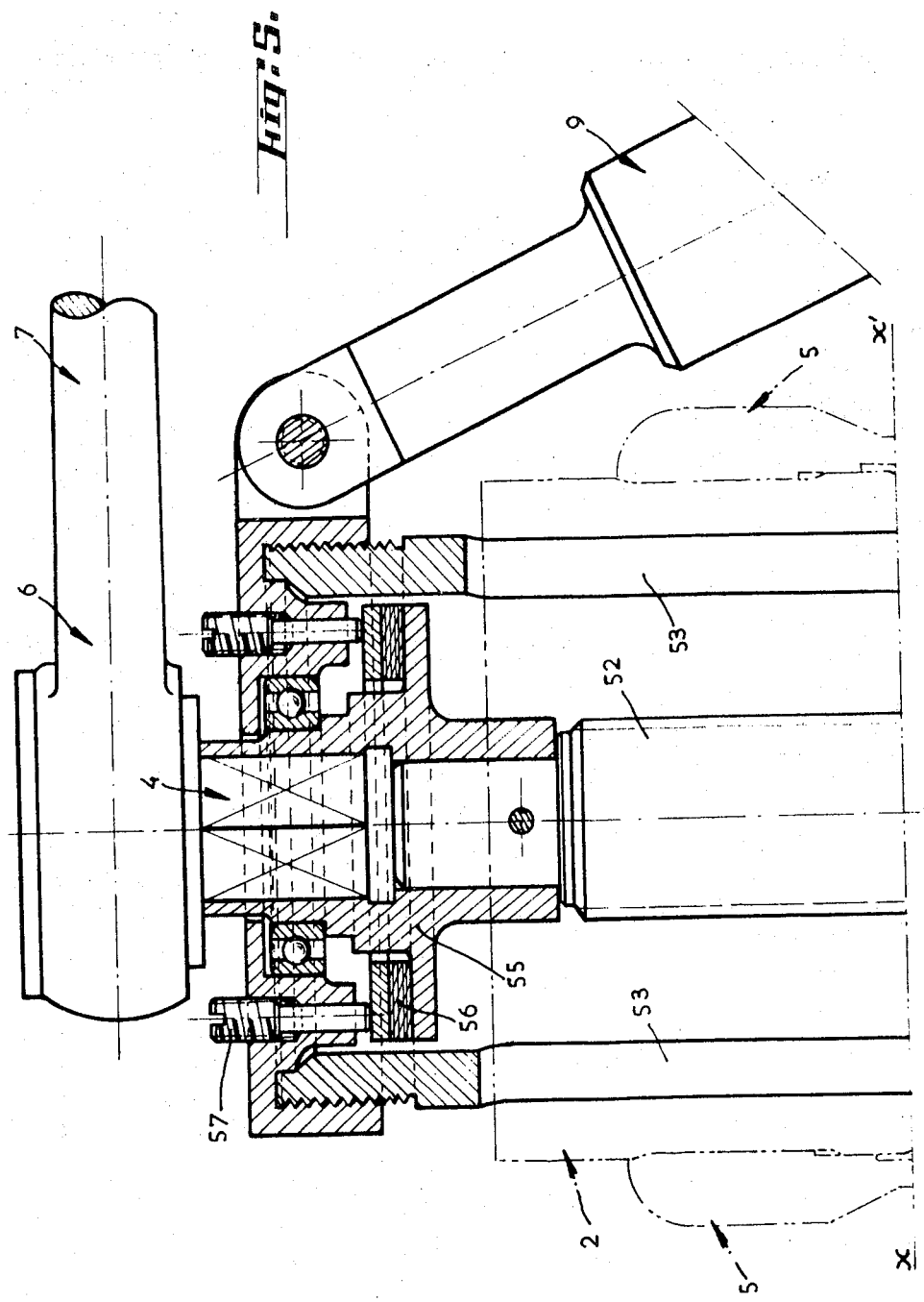
FIG. 5 shows one embodiment of a manual operating system for the sliding device shown in FIG. 4.

This column 1, tilted at 10° to the vertical, is equipped with a high-capacity central screw 52 (FIGS. 4 and 5) with a large number of threaded planet-wheels (not shown here). This screw 52 should allow forces to be converted with maximum efficiency.

The slider 2 is attached to a nut 51 of this screw 52 by means of small arms 5, which slide in two diametrically facing grooves 53. As the system is screwed or unscrewed, the hook 3 moves up or down.

The pitch of the screw/nut system can be adapted to suit the loads to be raised.

The screw 52 is operated by means of a spanner 6 with square socket 4. This spanner may also be fitted with a handle 7 equipped with a reversing ratchet (not shown here); this allows the load to be raised or lowered.

The hook 3 is intended to carry the lifting axle of the undercarriage.

The column 1 is at an angle of approximately 10° to the vertical, so that, whatever the height of the hook 3, it is at all times within a quadrilateral formed by four wheels 11 of a small truck 8. A strut 9, forming a triangle with the column and truck, holds the column at the required angle. A toe 10 extends forward from the truck, to provide security in the event of a reaction from the aircraft tending to topple the whole device forward.

The six wheels of the truck 8 (four wheels 11 and two wheels 12) move along a rail 13 with a U-shaped cross-section, which distributes the load on the ground and guides the truck; the hook 3 is thus always in stable equilibrium, whatever the kinematics of the point raised.

The presence of this rail 13 is not absolutely essential where the device is used on a cemented surface. Instead of the rail, the means of distributing the load can consist of a metal plate of sufficiently large surface-area, or a T-shaped rail.

The point of the mass raised does not move vertically, but along a curve, which depends on the compression of a shock-absorber of the leg carrying the wheel, or of a balancer in the case of large freight aircraft.

Transversely, the device remains perpendicular to the aircraft wings, because only the lower part of the column rests on the truck 8, with two side-plates 14 keeping it constantly centered laterally. Lengthwise, two projections 54 keep the column 1 in position, but it oscillates crosswise on its base in accordance with the movements of the aircraft, through the agency of a fitting on to which the hook 3 is hooked (each type of aircraft has its own particular fitting).

A brake 55 with discs 56, adjustable by means of screws 57, prevents any tendency to a reversal effect.

The ratchet spanner 6 may be replaced by a small reducing gear, either manually operated or driven by a small explosion, Diesel, electric, compressed air or hydraulic motor (not shown here), possibly remote controlled.

Manual operation using the handle 7 is very easy, and for medium-weight aircraft no reducing gear is needed.

Figure 2A:
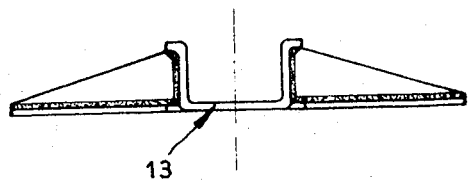
FIGS. 2a and 2b show one embodiment of the means of distributing the load.
Figure 2B:
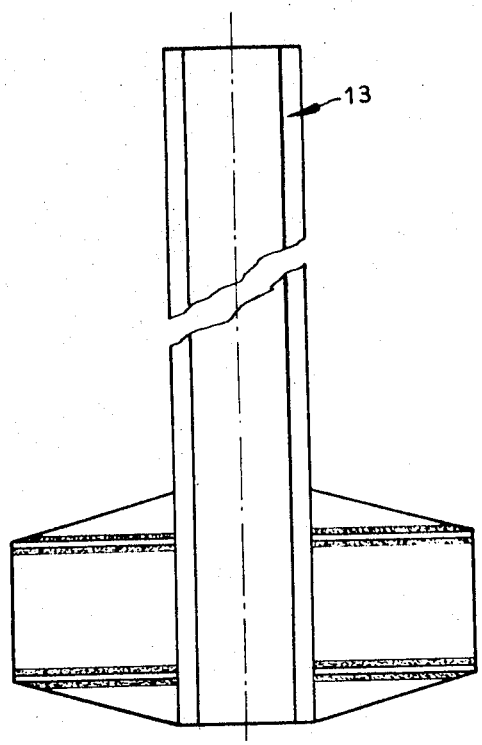

The truck may move on the cement floor of a hangar or on the load-distribution rail 13 (FIG. 2a).

For auxiliary undercarriages (or steering carriage such as the front wheel of three-wheeled aircraft), the column 1 fits into a socket 16 in a stand 17, which acts as a stabilizing and load-distribution plate (FIGS. 3a and 3b).

In this case the truck 8 and rail 13 are replaced by this stand 17, and the strut is attached at 18.

A Tergal (polyester textile) belt, combined with a T-shaped metal fitting, which rests on the hook 3, may be fitted to auxiliary undercarriages.

FIG. 6 shows another embodiment of the invention, in which hydraulic systems are used.

A column 101, quadrangular in cross-section, with two diametrically opposite apertures 102 in the top half, rests on a truck 103, where it is embedded in a socket.

This column, tilted 10° backwards, is held in this position by a strut 104, which is fitted by a plate and axle assembly 105 to the component 106 covering the top of the column.

The bottom end of the strut 104 is fixed to the truck 103 by a plate and axle assembly 107.

The strut is at an angle of 40° to the axis of the column.

The front of the cover 106 has a slide-hinge 108, allowing it to be removed rapidly.

The cover comes down and fits on to the top of the column 101, and is fitted to the top of the strut 104.

A mobile device slides along the column 101, consisting of:
 a - two trinangular-shaped side arms 109, joined at the bottom to form the cradle 110, which contains a half-spherical reception cavity 111 into which fits a lifting ball 112 of the undercarriage; this ball is of standard shape and size on all intercontinental aircraft;
 b - a balance-arm 113, sliding in grooves 102;
 c - a vertical connecting-rod 114, providing firm triangular support;
 d - axes 115, 116 and 117, linking the side arms 109, balance-beam 113 and connecting-rod 114, thus providing firm triangular support.

between the mobile device and the column takes place through:
 at the bottom, two small oscillating devices 118 with bogies 119, which run along the front surface of the column;
 at the top, two wheels 119' mounted on the axle 115, and running on the back surface of the column.

The upper and lower wheels 119 and 119' are covered with special Teflon, to avoid any damage to the surfaces of the column on which they run.

The device operates as follows.

Acted upon by a hydraulic jack 120, the top of which carries a spherical-topped head 121 to take up any play, the mobile device is moved upwards, thus raising the supporting ball 112, until the damaged wheel or wheels can be changed and replaced by new ones. Oil for pressure operation is fed in and discharged through the connection 124.

When pressure is withdrawn from the hydraulic jack, the oil passing through a diaphragm (not shown here) escapes slowly back into its supply tank, forced out by the contracting jack. The mobile device re-descends gently until the point where the aircraft wheels are again resting normally on the ground.

The kinematics of the operation are as follows.

During the raising or lowering operation, the vertical reaction of the undercarriage on the mobile device and column always acts on the installation in a direction vertical to the raising support point 112. This is possible regardless of the kinematics of the undercarriage because of the truck 103, which moves lengthwise along an axis parallel to that of the aircraft.

The truck 103 is a block of steel 100 mm wide, which can move lengthwise on 11 wheels 122, mounted on bushed axles 123 and placed along the truck axis.

The central position of the wheels 122 allows the device to tilt slightly in a transverse direction, enabling the wheel-changing device to follow aircraft oscillations (rolling movements) caused by atmospheric disturbances, when the operation is carried out in the open air.

The stability of the aircraft is maintained at all times by the contact between its other wheels and the ground.

Throughout the operation, the aircraft remains more or less horizontal.

The wheel-changing device is easy to handle because of the speed with which the different parts can be dismantled, being assembled as they are by means of axles and the slide-hinge of the cover 106.

The functioning and kinematics described here are similar to those for the device shown in FIG. 1. Naturally, the screw 52 shown in FIG. 1 can be replaced by direct or indirect hydraulic or pneumatic devices, and, symmetrically, mechanical or pneumatic devices can be substituted for the hydraulic systems shown in FIG. 6.

Clearly, the invention is by no means confined to the embodiments described and illustrated here. Many other variants will be possible for a man skilled in the art, depending on the applications involved, without any departure from the spirit of the invention.

For instance, the trucks 8 or 103 can of course be replaced by the stand shown in FIGS. 3a and 3b, in the case of the devices shown in both FIGS. 1 and 6. In addition, where the device is used to change the wheels on an undercarriage leg with a single truck (in other words with twin tyres), or on a leg with only one wheel, the lateral reactions produced by the strains exerted on the device by the aircraft can be absorbed by means of double lateral triangular support on the ground, the members being connected to the truck or stand of the device at ground level.

The wheel-change system covered by the present invention may be used for any military or civil aircraft moving away from their base and heavy enough to need special equipment for changing the wheels.

Only the metal fitting to be attached to the hook or socket varies with each type of aeroplane.

The strength of the device will naturally be calculated to suit the weight and utilization of the aircraft involved.

The wheels may also be fitted with differential systems allowing the truck to be used on uneven ground. Such a system, for instance, may consist of an elastic carpet placed beneath the truck or load-distribution device, in order to absorb the effects of irregularities in the ground.

I claim:

1. A device for jacking up and changing a wheel on a vehicle of large mass, such as an aircraft, comprising:
   an elongated base mounted on wheel means, said wheel means arranged in spaced pairs to provide horizontal movement for said base;
   a lifting jack column mounted on said base at a vertical angle in the range of 5°–20°;
   a supporting strut connected between the top of said column and an end of said base, said strut located in a plane passing through said column and between said pairs of wheels;
   a lifting element mounted on said column and operated by means to be lifted for sliding along said column at said angle thereof to lift said mass; and
   said wheel means having forward and rearward located wheels with respect to said element so that the force of said mass passing vertically through said element is always located between said forward and rearward wheels,
   said strut extending to a point on said base laterally spaced from said forward and rearward wheels.

2. A device according to claim 1 wherein said angle is in the range of 8°–12°.

3. A device according to claim 1 wherein said strut is positioned at approximately a 40° angle with respect to said base, and its connections to the top of said column and said base are provided by pivots.

4. A device according to claim 1 wherein said base comprises rail means within which said wheels are guided, and plate means are provided for the mounting of said column on said rail means.

5. A device according to claim 1 wherein a pair of arms are mounted respectively on each side of said column, and said arms are connected at a location forward of said column to form said lifting element.

6. A device according to claim 5 wherein each said arm is slidable along said column by means of an attached wheel rolling on the rear of said column and by an attached oscillating wheel means rolling on the front of said column.

7. A device according to claim 6 wherein the mounting of each arm is provided by a balance arm connected at one end of said rear arm attached wheels, and a rod is mounted to be generally parallel to the front of said column and having one end connected to the other end of said balance arm and the other end of said rod connected to said attached oscillating wheel means to permit movement of said rod and attached balance arm with respect to said column.

8. The device of claim 1 wherein further wheel means are provided on said base laterally spaced from said forward and rearward wheels.

9. The device of claim 1 wherein the mounting of said column on said base comprises a non-rigid coupling, said coupling comprising means inhibiting displacement of said column in the lengthwise direction of said base, and means for centering said column on said base.

10. The device of claim 1 in which longitudinally extending slots are provided in said column, wherein said means to be lifted comprises arm means guided in said slots, and means for coupling said lifting element for displacement with said arm means, further comprising means in said column for displacing said arm means for lengthwise movement of said column guided by said slots.

11. The device of claim 10 wherein said means for coupling comprises means coupled to said arm means externally of said column and mounted for guided movement along the external surface of said column.

* * * * *